United States Patent
Betz et al.

(10) Patent No.: US 7,356,250 B2
(45) Date of Patent: Apr. 8, 2008

(54) SYSTEMS AND METHODS FOR CREATING A SINGLE VIDEO FRAME WITH ONE OR MORE INTEREST POINTS

(75) Inventors: David Betz, Bedford, NH (US); Mindy Lam, Los Altos, CA (US); James Grunke, Milpitas, CA (US)

(73) Assignee: Genesis Microchip Inc., Santa Clara, CA (US)

( * ) Notice: Subject to any disclaimer, the term of this patent is extended or adjusted under 35 U.S.C. 154(b) by 1139 days.

(21) Appl. No.: 10/040,734

(22) Filed: Jan. 4, 2002

(65) Prior Publication Data

US 2002/0090201 A1    Jul. 11, 2002

Related U.S. Application Data

(60) Provisional application No. 60/271,691, filed on Jan. 5, 2001.

(51) Int. Cl.
*H04N 5/00* (2006.01)
*H04N 27/00* (2006.01)
*H04N 5/91* (2006.01)
*H04N 3/08* (2006.01)
*G06F 3/16* (2006.01)

(52) U.S. Cl. .................. 386/125; 386/126; 386/55; 386/68; 386/70; 715/723; 715/725; 348/231.1; 348/231.6; 348/240.99

(58) Field of Classification Search .................. 386/45, 386/1, 125–126, 111–112, 95, 55, 68, 70; 715/723, 725; 358/537, 538; 348/231.1, 348/231.6, 240.99, 240.2

See application file for complete search history.

(56) References Cited

U.S. PATENT DOCUMENTS

| | | | |
|---|---|---|---|
| 5,109,482 A | 4/1992 | Bohrman | |
| 5,237,648 A | 8/1993 | Mills et al. | |
| 5,239,418 A | 8/1993 | Tyler et al. | |
| 5,455,632 A | 10/1995 | Ichihara | |
| 5,457,478 A | 10/1995 | Frank | |
| 5,600,775 A | 2/1997 | King et al. | |
| 5,607,356 A | 3/1997 | Schwartz | |
| 5,621,871 A | 4/1997 | Jaremko et al. | |
| 5,692,212 A | 11/1997 | Roach | |
| 5,905,845 A | 5/1999 | Okada et al. | |
| 5,930,446 A | 7/1999 | Kanda | |
| 5,958,008 A | 9/1999 | Pogrebisky et al. | |
| 5,995,095 A * | 11/1999 | Ratakonda ............... | 715/500.1 |
| 6,108,042 A | 8/2000 | Adams et al. | |

(Continued)

OTHER PUBLICATIONS

Office Action mailed Aug. 9, 2007, from U.S. Appl. No. 10/040,741.

(Continued)

*Primary Examiner*—Thai Q. Tran
*Assistant Examiner*—Daquan Zhao
(74) *Attorney, Agent, or Firm*—Beyer Weaver LLP

(57) ABSTRACT

Systems and methods for creating virtual stop-off points in a movie title, where the viewer can explore interesting content using zoom, pan and gamma controls are provided. Methods include creating an interest point from one or more digital video titles. Systems include a composer for creating interest points in a video and a viewer for manipulating and displaying the interest points.

17 Claims, 8 Drawing Sheets

U.S. PATENT DOCUMENTS

| | | | | |
|---|---|---|---|---|
| 6,141,484 | A | * | 10/2000 | Nagasawa et al. ............ 386/52 |
| 6,144,375 | A | | 11/2000 | Jain et al. |
| 6,148,140 | A | | 11/2000 | Okada et al. |
| 6,236,744 | B1 | * | 5/2001 | Some et al. ................ 382/132 |
| 6,236,774 | B1 | | 5/2001 | Lackritz et al. |
| 6,408,128 | B1 | * | 6/2002 | Abecassis .................... 386/68 |
| 6,507,696 | B1 | | 1/2003 | Chung et al. |
| 6,600,868 | B2 | | 7/2003 | Tokashiki |
| 6,738,075 | B1 | * | 5/2004 | Torres et al. ............... 715/723 |
| 6,882,793 | B1 | | 4/2005 | Fu et al. |
| 7,055,100 | B2 | | 5/2006 | Moriwake et al. |
| 2002/0018136 | A1 | * | 2/2002 | Kaji et al. ............. 348/333.02 |
| 2003/0206716 | A1 | * | 11/2003 | Posa et al. .................... 386/68 |

OTHER PUBLICATIONS

Final Rejection mailed Oct. 19, 2007, from U.S. Appl. No. 10/041,084.

Office Action mailed Nov. 3, 2004 from U.S. Appl. No. 10/040,741.
Office Action mailed May 6, 2005 from U.S. Appl. No. 10/040,741.
Office Action mailed Jun. 16, 2005 from U.S. Appl. No. 10/040,741.
Office Action mailed Jan. 11, 2006 from U.S. Appl. No. 10/040,741.
Office Action mailed Feb. 8, 2006 from U.S. Appl. No. 10/040,741.
Office Action mailed May 3, 2006 from U.S. Appl. No. 10/040,741.
Office Action mailed Aug. 1, 2006 from U.S. Appl. No. 10/040,741.
Office Action mailed Sep. 8, 2005 from U.S. Appl. No. 10/040,741.
Office Action mailed Oct. 19, 2006 from U.S. Appl. No. 10/040,741.
Office Action mailed Feb. 23, 2007 from U.S. Appl. No. 10/041,084.
Office Action mailed Feb. 23, 2007 from U.S. Appl. No. 10/040,741.
Office Action mailed Jul. 31, 2006 from U.S. Appl. No. 10/041,084.
Office Action mailed Sep. 22, 2006 from U.S. Appl. No. 10/041,084.

* cited by examiner

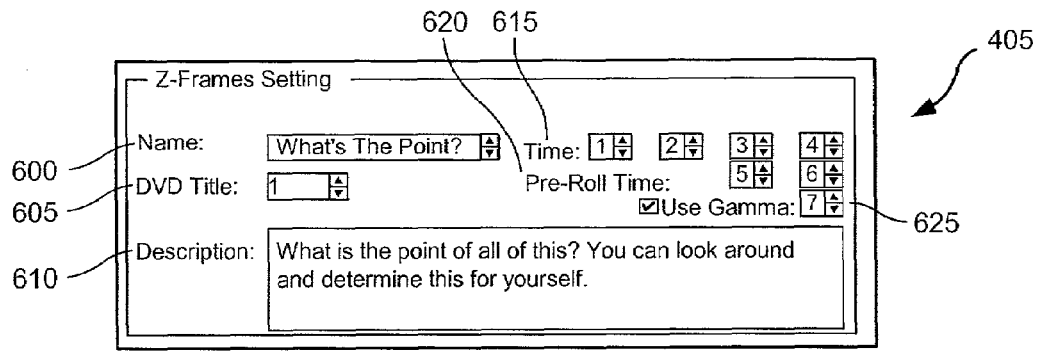
FIG. 6
| Name | X | Y | Zoom Level | Gamma | |
|---|---|---|---|---|---|
| Look Over There | -30 | 200 | 500 | 4 | |
| Look Over Here | -300 | 240 | 700 | . | |
| Now Look Here | 100 | -230 | 300 | 7 | |
FIG. 7
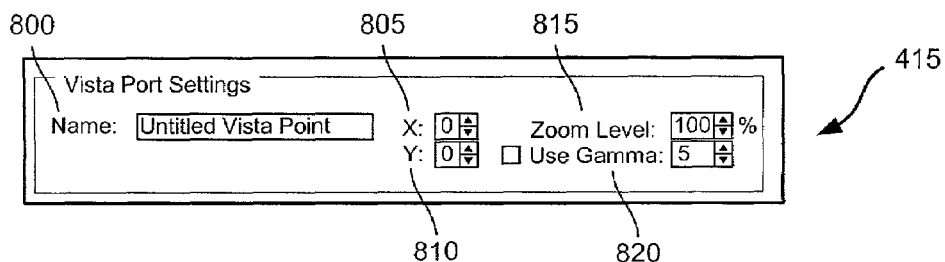
FIG. 8

SYSTEMS AND METHODS FOR CREATING A SINGLE VIDEO FRAME WITH ONE OR MORE INTEREST POINTS

CROSS-REFERENCES TO RELATED APPLICATIONS

This application claims the benefit of U.S. Provisional Application No. 60/271,691 filed on Jan. 5, 2001.

This application is being filed concurrently with related U.S. Patent Applications: U.S. patent application Ser. No. 10/040,741, entitled "Systems and Methods for Creating an Annotated Media Presentation"; and U.S. patent application Ser. No. 10/041,084, entitled "Systems and Methods for Creating a Video Montage from Titles on a Digital Video Disk" both filed on a date even herewith and all of which are incorporated herein by reference for all purposes.

BACKGROUND OF THE INVENTION

This invention relates generally to digital video disk (DVD) technology. More particularly, this invention relates to providing unique playback experience to a viewer.

In the past, audio/visual (AV) programs such as movies, television shows, music videos, video games, training materials, etc. have typically involved a single play version of the program. The user would begin play of the program and watch the program from beginning to end. A single presentation was implemented in displaying the program. A user did not have any option to view the program from a different angle, with a different soundtrack, in a different language, with subtitles, etc. because the video could not accommodate multiple options.

However, with the introduction of DVD technology, a user now has greater number of unique options to choose from. A storyline in a movie, for example, can be shot from different angles and stored as different versions on a DVD storage medium. Similarly, a movie might be sold with optional language tracks. Thus, a viewer could decide to watch the movie with a French language track rather than English, for example. As another example, a movie might be presented with different endings. Thus, a user could select a preferred ending option before playing the movie.

In addition, DVD technology provides a viewer with unique menuing options prior to the actual play of the DVD. Such menuing options may include the ability to view deleted scenes, the movie trailer, a director narrative, the making of special effects, or actor biographies, to name a few. Menuing options may provide "behind the scenes" insight into the movie or provide the viewer with information reorganized in a format that is otherwise not available. Anything that enhances the story and adds to the all-around movie environment creates a more enjoyable movie viewing experience for the viewer.

Thus, there is a need for a device and method which is capable of creating and providing unique playback options to a viewer of a DVD. There is also a need for a system and method that allows a creator of a DVD title to provide the viewer with options that may be of interest without disturbing the integrity of the titles contained on the DVD itself.

SUMMARY OF THE INVENTION

The present invention provides systems and methods for creating virtual stop-off points in a movie title, where the viewer can explore interesting content using zoom, pan and gamma controls. For example, points of historic interest used in a film setting may be shown, or the action of an exciting space adventure film may be frozen for the viewers further exploration. In one embodiment, gamma zooms appear as a menu of items to be explored. The points of interest are referred to as z-frames, which are points where the video can be automatically paused for the viewer's perusal. In addition, there may be some descriptive text relating the z-frame's importance to the title, or other significant information.

The method can be implemented using a software layer running in the background of a DVD player. As such, an enhanced DVD that is compatible with the software can control the DVD player to provide the viewer with special features. Further, this enhanced DVD technology is programmable, so that it is easy to improve and expand its capabilities.

In another embodiment, a composer for creating a z-frame from an enhanced DVD is disclosed. The composer has a user interface for entering, for example, the name of the z-frame. The composer provides a user interface for entering controls including, for example, the pre-roll time of the video and then the stop time of the z-frame. In addition, the composer can have a vista point chart for listing the characteristics of the various vista points. The composer also has a vista point setting area for entering the x-coordinate and the y-coordinate of the various vista points as well as the zoom level and gamma correction.

Other and further advantages and features of the invention will be apparent to those skilled in the art from a consideration of the following description taken in conjunction with the accompanying drawings wherein certain methods and apparatuses for practicing the invention are illustrated. However, it is to be understood that the invention is not limited to the details disclosed but includes all such variations and modifications as fall within the spirit of the invention and scope of the appended claims.

BRIEF DESCRIPTION OF THE DRAWINGS

FIG. 6 is a z-frame setting GUI for entering the name and description of the z-frame as well as the stop time and pre-roll time;

FIG. 7 is a vista point chart for displaying the vista points in a z-frame;

FIG. 8 is a vista point setting GUI for entering the x-coordinate and y-coordinate of the vista point as well as the zoom level and gamma correction;

DESCRIPTION OF THE SPECIFIC EMBODIMENTS

The invention provides exemplary systems and methods for pausing a video at a point of interest and thereafter further exploring the information contained in the area. The video is paused and manipulated from a completed film using software or, in some embodiments using hardware, so additional editing or replication of the film is unnecessary. In addition, the points of interest may be taken from all of the titles on a DVD, so the main feature, as well as theatrical trailers, deleted scenes and director's cuts can be used in a compilation. Some embodiments provide for accessing portions of scenes, portions of individual frames, single frames, or one of multiple views of the same scene.

As used herein, the term "z-frame" may be used to refer to a point of interest in a video. A z-frame is a single frame of a video where the video is paused and manipulated for the viewer's benefit. The points of enhancement on a z-frame may be referred to as "vista points." A vista point is a subset of the z-frame where information in the z-frame is zoomed, gamma corrected or panned. As one skilled in the art can appreciate, the terminology used to identify and describe the individual clips and the compilation should in no way limit the scope of the invention.

Moreover, the invention described herein will occasionally be described in terms of a NUON™ system. As one skilled in the art can appreciate, any software enhanced digital playback device system may be used, but for ease of description and general understanding, the following description will be described in terms of a NUON™ system.

Figure 1A:
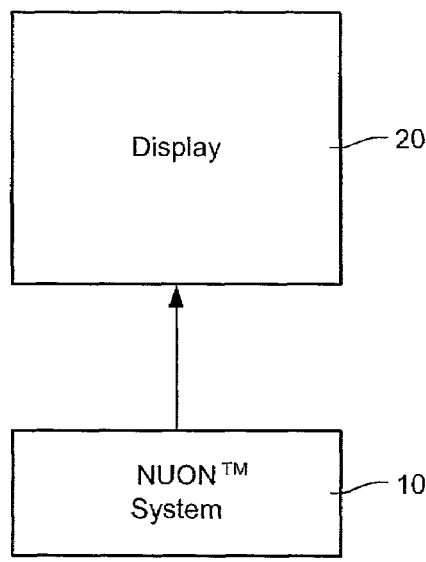
FIG. 1A is a system drawing for implementing the present invention.

FIG. 1A illustrates a basic configuration for implementing the various embodiments of the present invention. Other configurations may be utilized, however, the illustrated configuration provides a simple yet effective implementation. As shown, NUON™ system 10 is a combination programmable single chip media processor with system and application software that enables hardware manufacturers to develop sophisticated and highly interactive digital video playback device. Digital playback devices may include, but are in no way limited to, DVD players and set-top boxes to name a few. As shown, system 10 is coupled to display 20.

In one embodiment, system 10 comprises a NUON™ DVD system having a software layer running in the background. The software is similar to the operating system on a personal computer. The software allows enhanced digital video discs to take control of the system in a similar manner to a software application that operates on a PC. Since it is software based, system 10 is programmable in much the same way as a general purpose microprocessor-based computer. Therefore, the system is easily improved and expanded.

Figure 1B:
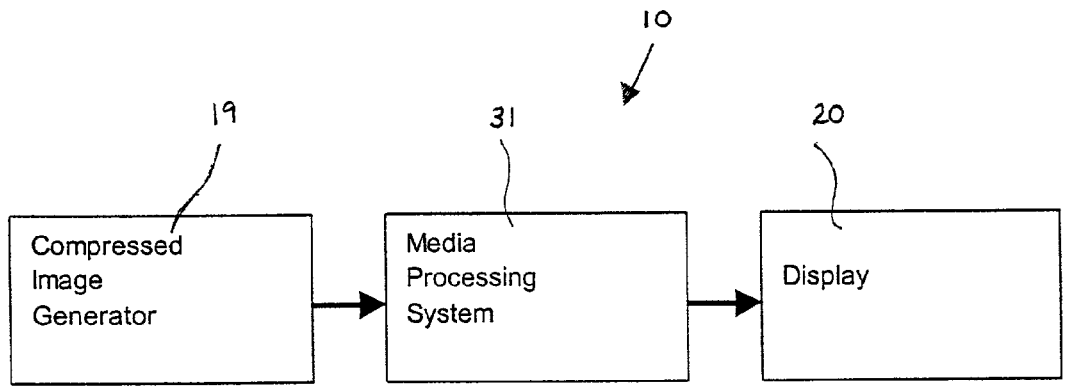
FIG. 1B is a block diagram of Nuon™ system.

FIG. 1B is a general block diagram of an exemplary embodiment of a system 10 configured to decompress and process z-frames and vista points created in accordance with the invention. The system preferably includes a compressed image generator 19, such as a hard disc drive, a cable television system, a satellite receiver, or a CD or DVD player, that can generate or provide a digital compressed media stream. System 10 also includes a display 20 for displaying decompressed full-motion images. The compressed media stream, that may include audio and visual data, enters a media processing system 31 configured to decompress the compressed media stream. In addition, media processing system 31 also may process digital data contained in the compressed data stream or in another storage device or digital data source, at the same time as it decompresses the compressed media stream, thus generating other types of media data that may be used with the decompressed media stream. For example, an interactive, color, full motion video game may be created. Once all of the data has been decompressed and processed, the data is output to display 20 for viewing. For a cable or satellite television system, media processing system 31 simply may decompress the incoming compressed digital data and output the images onto display 20, which in accordance with one embodiment of the present invention, may be a television screen.

Figure 1C:
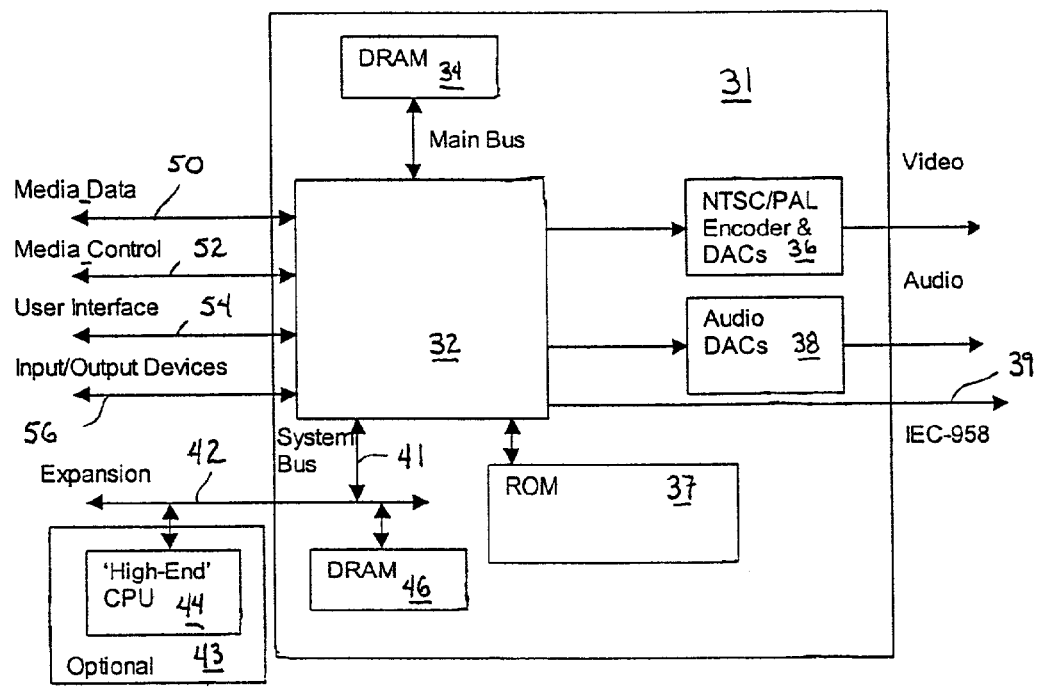
FIG. 1C is a block diagram of a media processing system.

FIG. 1C is a block diagram of the architecture of media processing system 31 in accordance with one embodiment of the present invention. Media processing system 31 includes a media processor 32, which can perform a number of operations, such as decompressing compressed video data, processing digital data that may include the decompressed video data and/or other digital data to generate full-motion color images, and controlling other operations within media processing system 31. Media processor 32 may be fabricated on a single semiconductor chip, or alternatively, the components of media processor 32 may be partitioned into several semiconductor chips or devices.

Additionally, media processing system 31 can include multiple media processors 32 to handle a variety of simultaneous data streams. The multiple media processors 32 can be incorporated on a single chip or implemented using multiple chips. It should thus be recognized that a single data stream and multiple data streams may be manipulated and/or displayed in accordance with the present invention.

Media processing system 31 also preferably includes one or more storage devices 34, 46, such as DRAM, SDRAM, flash memory, or any other suitable storage devices for temporarily storing various types of digital data, such as video or visual data, audio data and/or compressed data. Any data that is to be processed or decompressed by media processing system 31 preferably can be loaded from a main memory (not shown) into DRAM and/or SDRAM, because DRAM and/or SDRAM can be accessed more rapidly due to its quicker access time. Data that has been processed by media processing system 31 may be temporarily stored in the DRAM and/or SDRAM either before being displayed on the display or before being returned to the main memory. Various memory configurations are possible in accordance with the present invention. For example, where two media processors 32 are implemented, each may have a separate internal memory, or each may share a common memory.

When processing multimedia data, media processor 32 is configured to generate a digital image data stream and a digital audio data stream. A video encoder and digital-to-analog converter (DAC) 36 converts the digital image data output from media processor 32 into analog image signals, such as composite video, s-video, component video, or the like that can be displayed on a display device, such as a television or a computer monitor. An audio digital-to-analog converter (DAC) 38 converts the digital audio signals output by media processor 32 into analog audio signals (preferably about 2-8 separate audio channels) that can be broadcast by an audio system, or the like. In accordance with an alternative embodiment, media processor 32 also may output an IEC-958 stereo audio or encoded audio data signal 39, which is an audio output signal intended for connection to systems which may have internal audio decoders or digital-to-analog converters (DACs).

Media processor 32 also may include a second storage device 37, such as a read only memory (ROM) or the like, which can be used to store a basic input/output operating system (BIOS) for media processing system 31, audio tables that may be used to decompress the audio data and generate synthesized audio, and/or any other suitable software or data used by media processor 32 and media processing system 31. Media processor 32 further may include an expansion bus 42 connected to a system bus 41, so that one or more expansion modules 43 may be connected to media processor 32. Expansion module 43 may include additional hardware, such as a microprocessor 44 for expanding the functionality of media processing system 31. As illustrated in FIG. 1C, additional memory 46 also may be connected to processor 32 via expansion bus 42 and system bus 41.

As just one example, expansion module 43 may be a PC allowing interaction of a user with media processing system 31. Such interaction may include the creation of a interest point or vista point as described blow, or the selection of an interest or vista point.

Media processor 32 preferably includes several communication connections for communicating between media processor 32 and the rest of media processing system 31. A media data connection 50 permits the transfer of media data between media processor 32 and other systems, such as compressed image generator 19 (FIG. 1B). A media control connection 52 transfers control signals and/or data between media processor 32 and other systems, such as $I^2C$ compatible devices and/or interface hardware connected to system bus 41. A user interface connection 54 transfers user interface data between media processor 32 and user interface peripherals, such as joysticks, IR remote control devices, etc. Finally, an input/output channel connection 56 allows for connections to other I/O devices for further expansion of the system.

Media processing system 31 may be used for a variety of applications, such as full-motion color video games, cable and satellite television receivers, high definition television receivers, computer systems, CD and DVD players, and the like. For example, in a video game application, digital data representing terrain, action figures, and other visual aspects of a game may be stored in main memory or input from a peripheral digital data source. In accordance with this aspect of the invention, media processing system 31, and more particularly processor 32, processes the digital data from one or more digital data sources, generating interactive full-motion color images to be displayed on a video game display. Media processing system 31 also may generate audio signals that may add music and sound effects to the video game.

For a cable or satellite television receiver, media processing system 31 decompresses compressed digital video and audio signals received from a cable head end system or satellite transmitter, and generates decompressed digital video and audio signals. The decompressed digital video and audio signals then are converted into analog signals that are output to a television display. Media processing system 31 also may be configured to decrypt any encrypted incoming cable or satellite television signals.

For a DVD player, media processing system 31 preferably receives compressed digital data from a DVD or CD, and decompresses the data. At the same time, media processing system 31 may receive digital data stored on a ROM, for example ROM 37, or input from another digital data source, and generate a video game environment in which the decompressed DVD or CD color images are displayed along with the data received from the ROM or other digital data source. Thus, an interactive, full-motion, color multimedia game may be operated by media processing system 31.

One of ordinary skill in the art will recognize that other systems are possible for processing and/or creating z-frames, vista points, according to the present invention. Details of other processing systems and elements thereof are provided in U.S. patent application Ser. No. 09/476,761, filed Jan. 3, 2000, and entitled "A Media Processing System And Method", the entirety of which is incorporated herein by reference for all purposes; U.S. patent application Ser. No. 09/476,946, filed Jan. 3, 2000, and entitled "Communication Bus for a Multi-processor System", the entirety of which is incorporated herein by reference for all purposes; U.S. patent application Ser. No. 09/476,698, filed Jan. 3, 2000, and entitled "Subpicture Decoding Architecture And Method", the entirety of which is incorporated herein by reference for all purposes.

Figure 2:
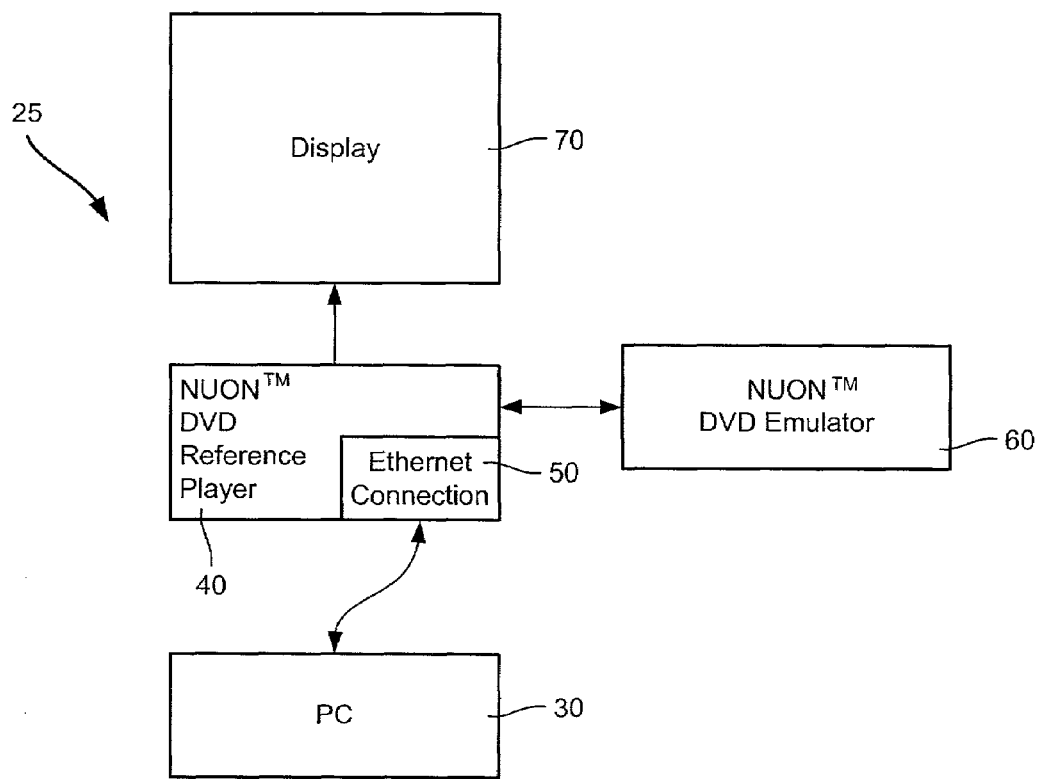
FIG. 2 is a block diagram of a development system for creating work-in-progress and run time files in accordance with the present invention.

FIG. 2 is a block diagram illustrating components of a NUON™ development system 25 for creating work-in-progress and run time files in accordance with one aspect of the present invention. In some embodiments, such a development system 25 is tailored for use by an author of a title available on a DVD and in other embodiments, development system 25 is tailored for use by a viewer of a title available on a DVD. Where the system is used by a viewer, the viewer is capable of creating 'customized video presentations tailored to the viewer's particular taste.

As discussed above, in some embodiments development system 25 is used by an author who creates enhanced DVD titles for use in NUON™ DVD system 10, otherwise referred to as an enhancement author. In one embodiment, development system 25 comprises a personal computer 30 coupled to a NUON™ DVD reference player 40 using an Ethernet connection 50. In another embodiment, personal computer 30 could also be a hub connected to a server, such that multiple computers would have access to NUON™ reference player 40. NUON™ DVD reference player 40 is coupled to a NUON™ DVD emulator 60. In one embodiment, NUON™ DVD emulator 60 is a storage device such as a hard drive, and is used to emulate the operation of a DVD and for storing any work-in-progress. NUON™ DVD reference player 40 is also coupled to a display 70.

Figure 3:
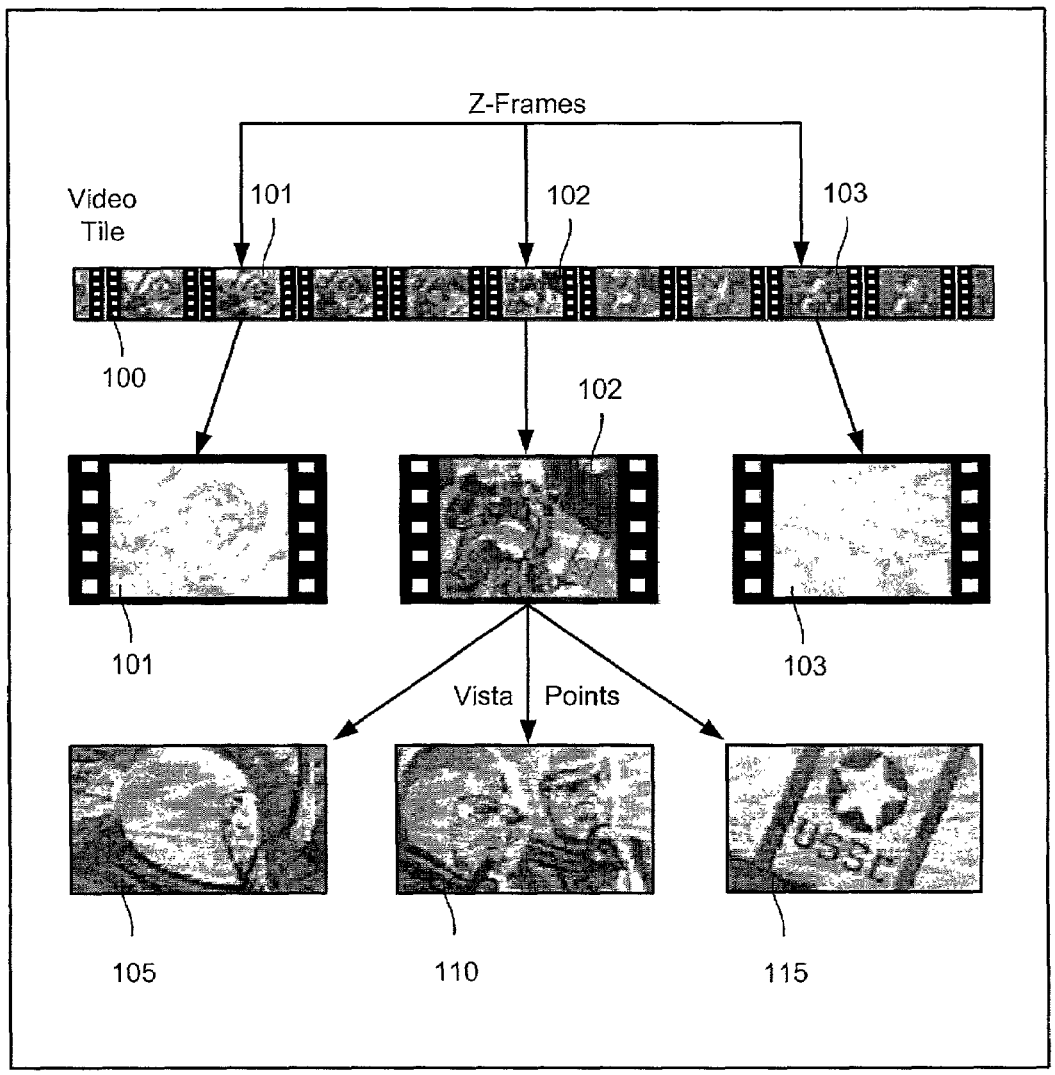
FIG. 3 shows a z-frame with several vista points.

FIG. 3 illustrates the pausing of a video title 100 thereby creating the single video frames or z-frames 101, 102, 103. In one embodiment, video title 100 may be a single movie title or it may be several video titles on a DVD. The z-frames can then be further manipulated by creating vista points. Vista points can be portions of a single video frame or in some embodiments, portions of a single video scene or series of video frames. In some embodiments, the aspect ratio of vista points are selected such that a particular vista point is scalable to fit a display window. In other embodiments, the aspect ratio of vista points is unrelated to the aspect ratio of a display window. In fact, in some embodiments, vista points can be any shape including, but not limited to circles, triangles, rectangles, and other polygons.

In the illustrated example, three rectangular vista points 105, 110 and 115 are created from a single z-frame, however any number of vista points may be generated without departing from the scope of the invention. Note in the illustration that z-frames 101, 102, 103 are taken from video title 100 in a sequential order. Although not illustrated, the z-frames may be taken from any video title in any order on a DVD. Moreover, z-frames may be pulled from any title that appears on the DVD, including director's cuts, deleted scenes, and theatrical trailers.

Z-frames and their associated vista points add value to a DVD title by pulling, and then specifying vista points 105, 110 and 115 or zoom areas and thereafter making gamma changes to show in greater detail what is going on in the title being enhanced. For example, FIG. 3 could represent a scene in a space adventure film. This type of film is going to be fast paced with lots of detail in many areas all at once. To create a gamma zoom of a critical moment in the action, the author would first locate an exact frame where a pivotal encounter occurs, for example z-frame 102. This is done by specifying the DVD run-time for the frame. Next, assume that there is an approaching alien. The creative author may specify those points of interest as a vista point 105, which can then be selected by the viewer to be zoomed in on.

Gamma change can be specified for the whole z-frame, which would change relative brightness and contrast of the z-frame, or if desired for specific vista points. Such vista points could lighten a shadowy area where some of the alien's confederates might lurk (vista point 110), or better show what the emblem on the rocket ship says (vista point 115). In the example of FIG. 3, there are only three vista points specified for this particular gamma zoom z-frame 102, but in fact the number of vista points has no limit. In addition, a sentence or two of descriptive text may be added, describing the importance of the Gamma Zoom frame in relationship to the title.

Figure 4:
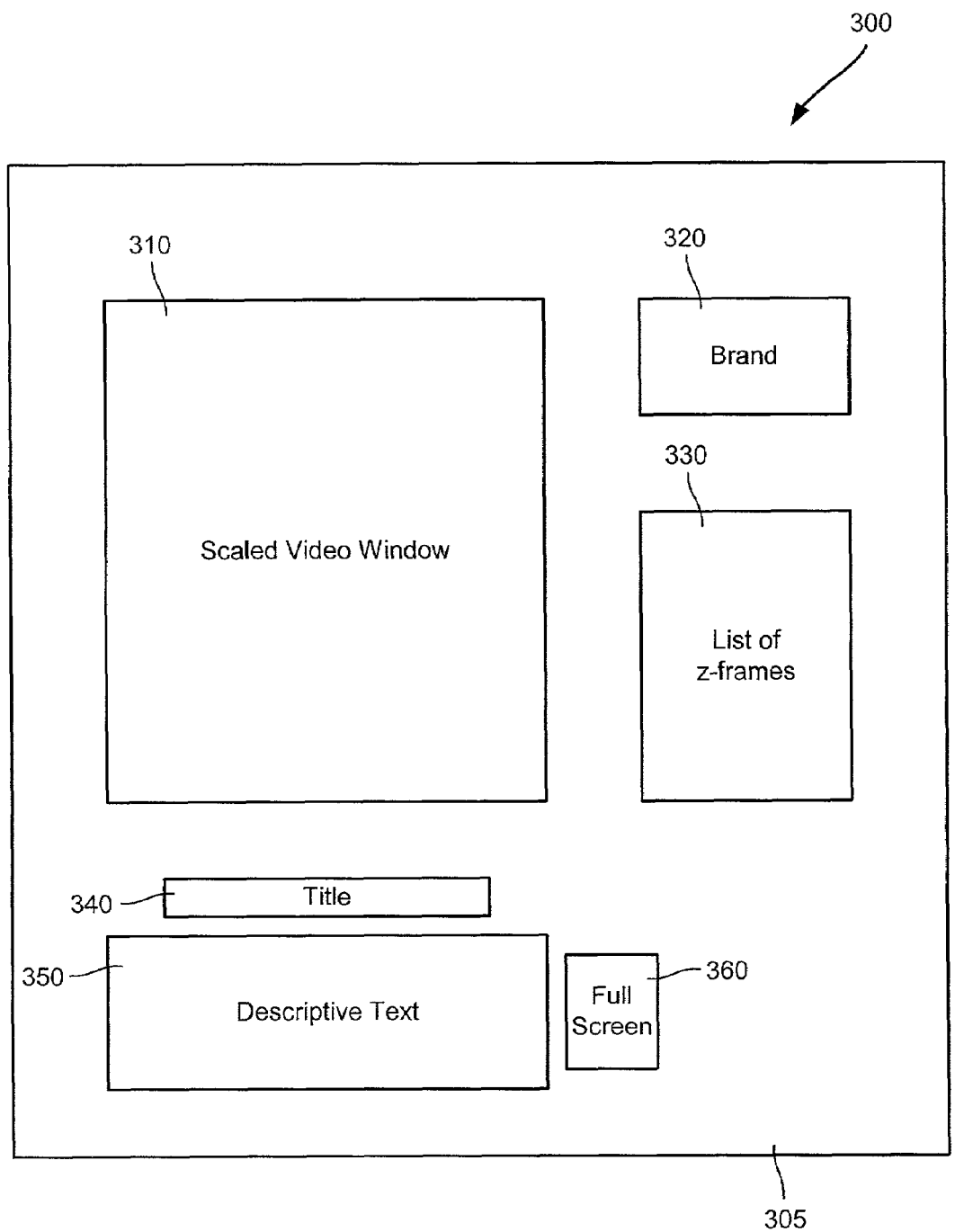
FIG. 4 is a z-frame menu for presenting one or more z-frames to a viewer.

FIG. 4 illustrates a typical embodiment of a gamma zooms menu 300 in accordance with one embodiment of the invention. Gamma zooms menu 300 organizes all the created z-frames into a single location for selection by a viewer of an enhanced DVD. As shown, gamma zooms menu 300 is shown on display 305. Gamma zooms menu has a scaled video window 310 for displaying a small scale version of a selected z-frame. A particular z-frame is selected by a viewer from a list of z-frames 330. Although not illustrated in FIG. 4, list 330 shows all the z-frames created for the enhanced DVD. Gamma zoom menu 300 also has an area for a title of the z-frame 340 and an area for descriptive text of the z-frame 350. Both the title and the descriptive text correlate to the z-frame shown in scaled down window 310.

Continuing with the description of the figures, in one embodiment, gamma zoom menu 300 illustrated in FIG. 4 is a full screen bitmap image (720×480 pixels) much like any typical piece of DVD menu artwork. However, the illustrated menu has a "picture-in-graphic" display. As such, although not apparent from this drawing, moving video actually appears in scaled video window 310 in real time. Another novel aspect of features menu 300 is that text in title area 340 and descriptive area 350 can be displayed dynamically. Therefore, menu items in z-frame list 330 or other text such as the descriptive text or title is not included in the bitmap image. This text is displayed by software, and is based on the text that is entered into a gamma zoom composer described hereinafter. Other graphic items, such as logos and heading text 320, will still be part of the background bitmap.

In operation, the viewer observes a particular z-frame by simply selecting the gamma zooms menu, navigating to the desired z-frame in list 330, and selecting the particular z-frame for viewing. The z-frame will be shown in scaled video window 310 with the corresponding title 340 and descriptive text 350. If the viewer wishes to see the z-frame on a full screen, they simply select full screen option 360.

In some embodiments, the viewer can toggle between display of the z-frame and the vista points associated with the z-frame. In such embodiments, the list of z-frames 330 also includes a list of vista points associated with the various z-frames. In some embodiments, the descriptive text is replaced by or augmented with hyper slides as further described in U.S. patent application Ser. No. 10/041,084, entitled "Systems and Methods for Creating a Video Montage from Titles on a Digital Video Disk".

Figure 5:
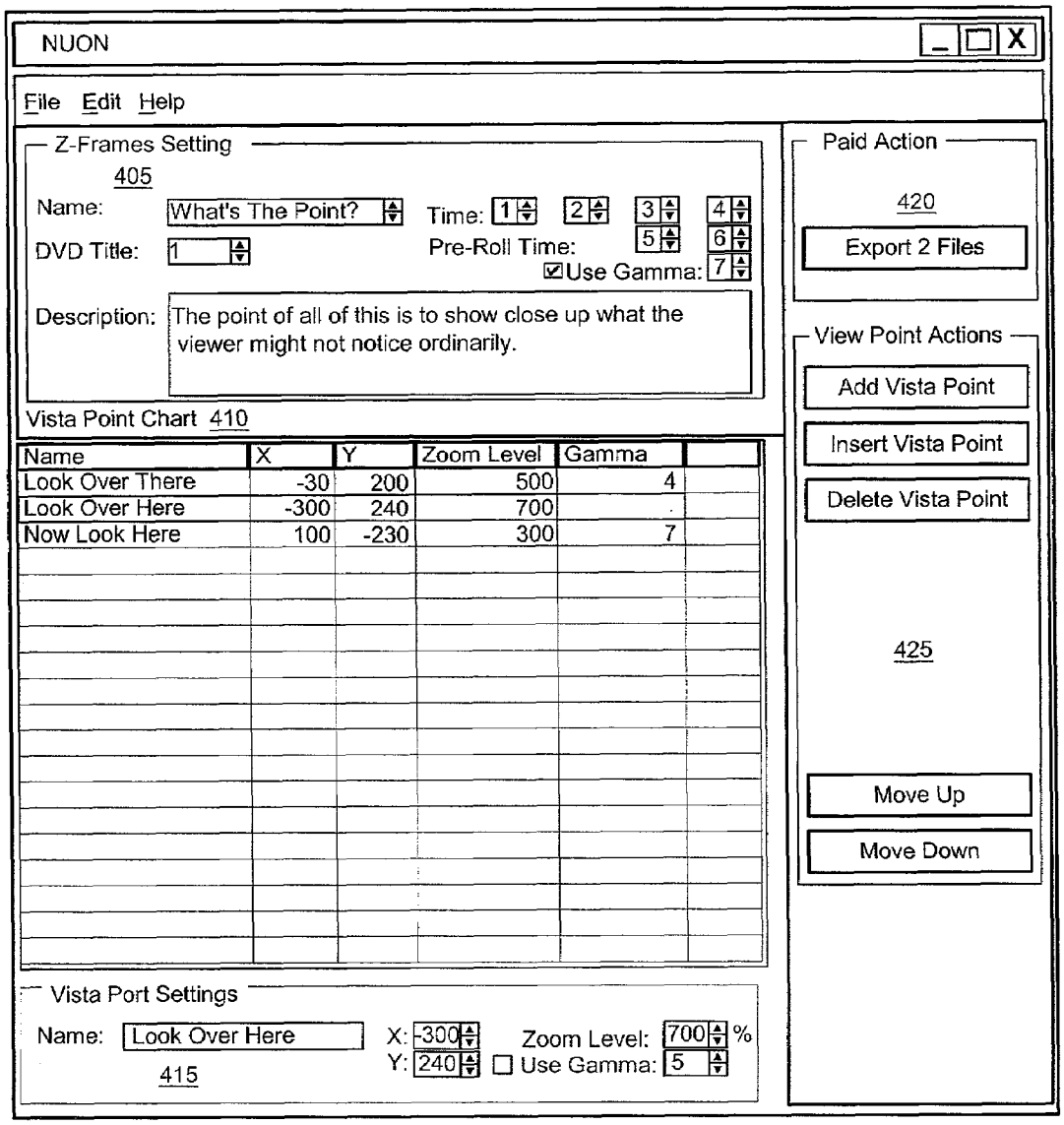
FIG. 5 is a gamma zoom composer for creating a z-frame.

FIG. 5 illustrates one embodiment of a gamma zooms composer main window 400. Gamma zoom composer 400 is for entering gamma zoom z-frame and vista point information. As illustrated, gamma zoom composer 400 is a standard window with a menu bar at the top, text entry fields, and several buttons to make selections.

In the middle of gamma zoom composer window 400 is a vista point chart 410. Vista point chart 410 displays the vista point information for a particular gamma zoom z-frame. Just above vista point chart 410 is z-frame setting area 405. Z-frame setting area 405 is the area for entering, among other things, the name and description of the z-frame and the DVD title for the z-frame, and as such appears as an individual menu item in z-frame list 330 of gamma zooms menu 300. To the right of z-frame setting area 405 are several user interfaces for entering the z-frame pause time, pre-roll time and gamma level. To the right of vista point chart 410 are the gamma zooms action buttons 420 and 425. Action buttons 420 and 425 include, but are in no way limited to, exporting the gamma zoom, adding a vista point, inserting a vista point, deleting a vista point and moving a vista point up or down to name a few. Finally, below vista point chart 410 is a vista point setting area 415 for entering all of the important vista point information.

Gamma zoom build action button 420 is used to test and export gamma zoom z-frames. The export z-frame button exports the current z-frame in an executable file format. In one embodiment, the file is a director script format file (e.g. *.bob), which will run on a NUON™ system. When selected, a dialog box is displayed. A gamma zoom set number is selected, which in one embodiment is between 1 and 16. This number correlates to a specific entry in the gamma zoom menu 300. Once the number has been selected, the gamma zoom set will be exported to the proper directory.

FIG. 6 illustrates an isolated view of a z-frame setting area 405. Setting area 405 establishes the settings for each individual z-frame in a gamma zoom z-frame. Name field 600 is for entering the name of a gamma zoom z-frame that will be displayed in the gamma zoom menu that is presented to the viewer. Below name field 600 is DVD title field 605. DVD title field 605 selects the DVD title for a z-frame. As stated above, a z-Frame may be pulled from any title on a DVD, including the main feature, director's cuts, theatrical trailers, to name a few. Below DVD title frame 605 is description field 610. Descriptive information that is displayed in gamma zooms menu 300 is entered into description field 610.

Continuing with FIG. 6, to the right of name field 605 are time field 615, pre-roll time field 620 and use gamma field 625. Time field 615 sets the z-frame stop time in hours, minutes, seconds, and frames. The stop time pauses the z-frame will after the defined pre-roll time 620. In the illustrated example, the time can be changed by typing over any of the time values, or using the spinners to select time values. In one embodiment, the hours value is limited to 4, the minutes and seconds values are limited to 59, and the frames value is limited to 29. Pre-roll time field 620 sets the pre-roll time in seconds, and frames. The pre-roll time is the amount time that video will be played before the z-frame is paused In one embodiment, the seconds value is limited to 59 and the frames value is limited to 29. Use gamma field 625 is in use if the box is checked. In one embodiment, the default value of 5 is neutral and therefore no difference in the gamma of the image. Gamma values between 6 and 10 will cause the image to look brighter, while values of 0 to 4 cause a darker appearance. The Gamma setting will affect the whole z-frame when it is displayed in full screen mode.

FIG. 7 shows an isolated view of vista point chart 410. Vista point chart 410 is where an author may add, insert, delete and otherwise arrange vista points entered into a gamma zoom z-frame. This is the main display area of gamma zoom composer 400. Most of the other controls in the main window have a direct effect on the chart. There are no editing features for vista point chart 410, only selecting individual vista points for editing, as well as resizing the chart columns to accommodate showing text of differing lengths. Vista point chart 410 displays the x-coordinate and y-coordinate for each vista point in columns 710 and 720 respectively. In addition, the zoom level and gamma level are displayed in columns 730 and 740 respectively.

FIG. 8 shows an isolated view of the vista point setting area 415 for entering all of the important vista point information. As vista points are added in setting area 415, the initial values will be set to the defaults shown, however the default values may be modified. Vista point setting area 415 edits a previously created vista point selected from vista point chart 410. Name field 800 is one the only pieces of data that doesn't get used by a NUON.™ system or displayed on any menu screen. Name field 800 is for the benefit of the author. Text entered in name field 800 is displayed in the name column 700 of the vista point chart 410. Each vista point of a z-frame will have its own name.

Continuing with FIG. 8, x-coordinate field 805 and y-coordinate field 810 set the X (horizontal) and Y (vertical) coordinates of the vista point. The origin point for X/Y is in the exact center of the 720w X 480h frame, so X values of between +/−320, and Y values of +/−200 are possible. Negative X values will set the vista point X to the left of the centerline, positive to the right. Negative Y values will set the vista point Y above the centerline, positive below it. Each vista point of a z-frame has will have its own X and Y coordinates. Zoom level field 815 sets the zoom level of the vista point to 100% (no effect) through 700%. Each vista point of a z-frame has its own zoom level. Use gamma field 820 uses the gamma level set if the checkbox is checked. The default value of 5 is neutral and therefore no difference in the gamma of the image. Gamma values between 6 and 10 will cause the image to look brighter, while values of 0 to 4 cause a darker appearance. This Gamma setting will affect only the specific vista point when it is displayed in full screen mode (as opposed to the z-frame gamma setting, which affects the whole z-frame). Each vista point of a z-frame has its own use gamma settings.

In the example shown in FIGS. 5, 6 and 7, the gamma zooms z-frame is named "What's The Point?" This z-frame includes three Vista Points named; "Look Over There", "Look Over Here", and "Now Look Here". Associated with each vista point are X and Y coordinates (corresponding to locations in the Z-Frame), zoom level, and gamma checkbox and text entry field. The information in the window shown, when exported, will create a single gamma zoom z-frame named "What's The Point". This z-frame, when displayed by a NUON™ system will list in a menu the named vista points, which can then be selected by the viewer for zooming.

Figure 9:
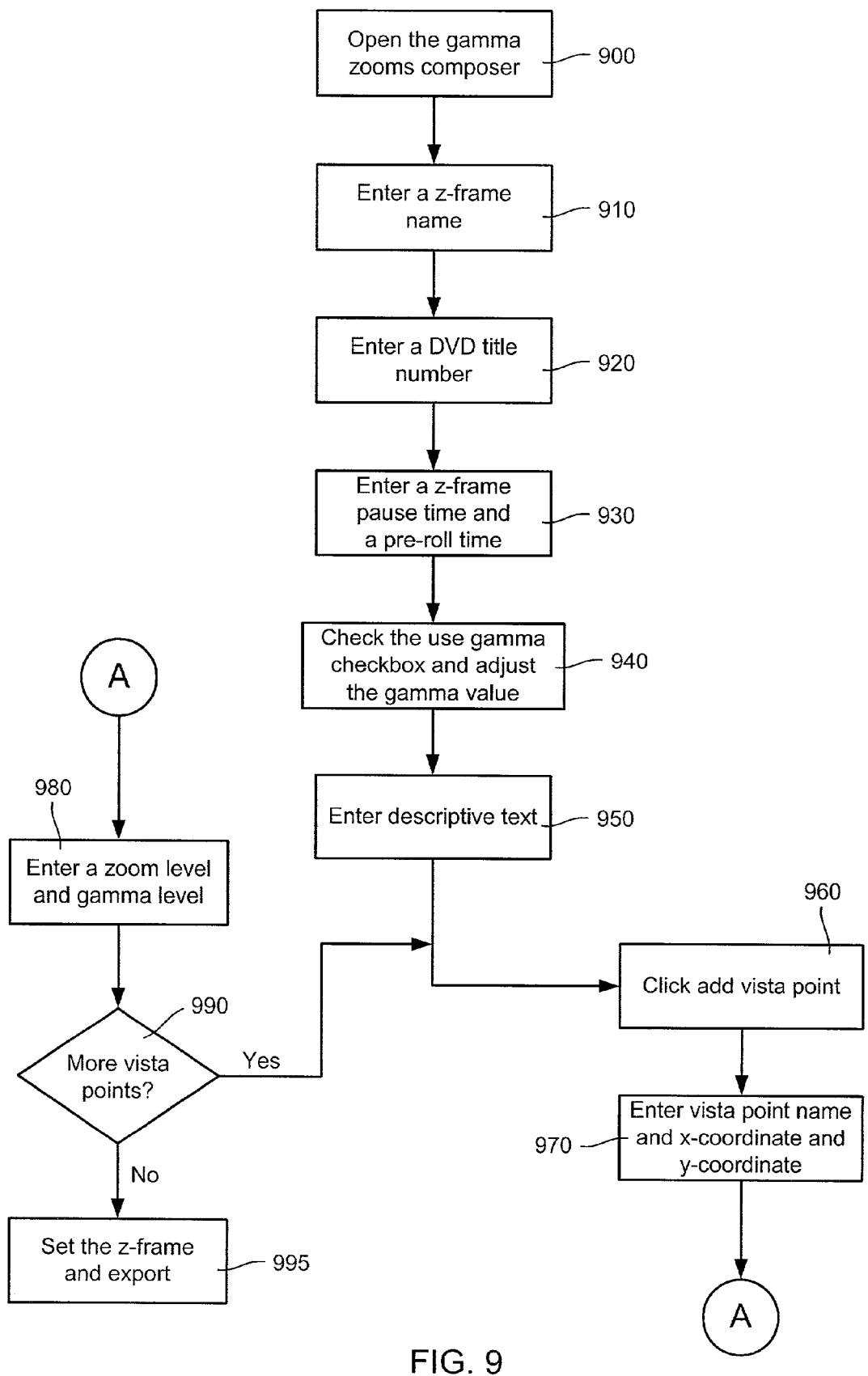
FIG. 9 is a flow diagram illustrating a method in accordance with the present invention.

FIG. 9 illustrates a flow chart for the steps of creating a gamma zoom z-frame. The gamma zoom composer main window 900 is opened (step 500) to begin the process of entering the individual z-frames and vista points. As shown, a z-frame name (step 910) and a DVD title number (step 920) is entered into the user interface. Next, a z-frame pause time and a pre-roll time (step 930) is entered into the user interface. Continuing, the gamma checkbox is checked and the gamma value is adjusted. Then, descriptive text regarding the z-frame is entered (step 950).

Continuing with the process of adding vista points, the "add vista point" button is selected (step 960) to add a vista point to the gamma zoom z-frame. Next, a vista point name, an x-coordinate and a y-coordinate are entered into the user interface (steps 970). Continuing, a zoom level and gamma level are entered (step 980). If it is necessary to enter more vista points into the gamma zoom z-frame, steps 960-980 are repeated for each vista point. If the final vista point is entered, the file containing the gamma zoom z-frame is saved and exported in a run time file format.

It should be noted that "add vista point" append the vista points to the end of the chart. In addition, the vista points will appear in the z-frame in the same order as they appear in the chart. Vista points can be captured from any part of the movie in any order. The z-frame may be taken from end then beginning, or skip around, and can even jump from title to title.

Figure 10:
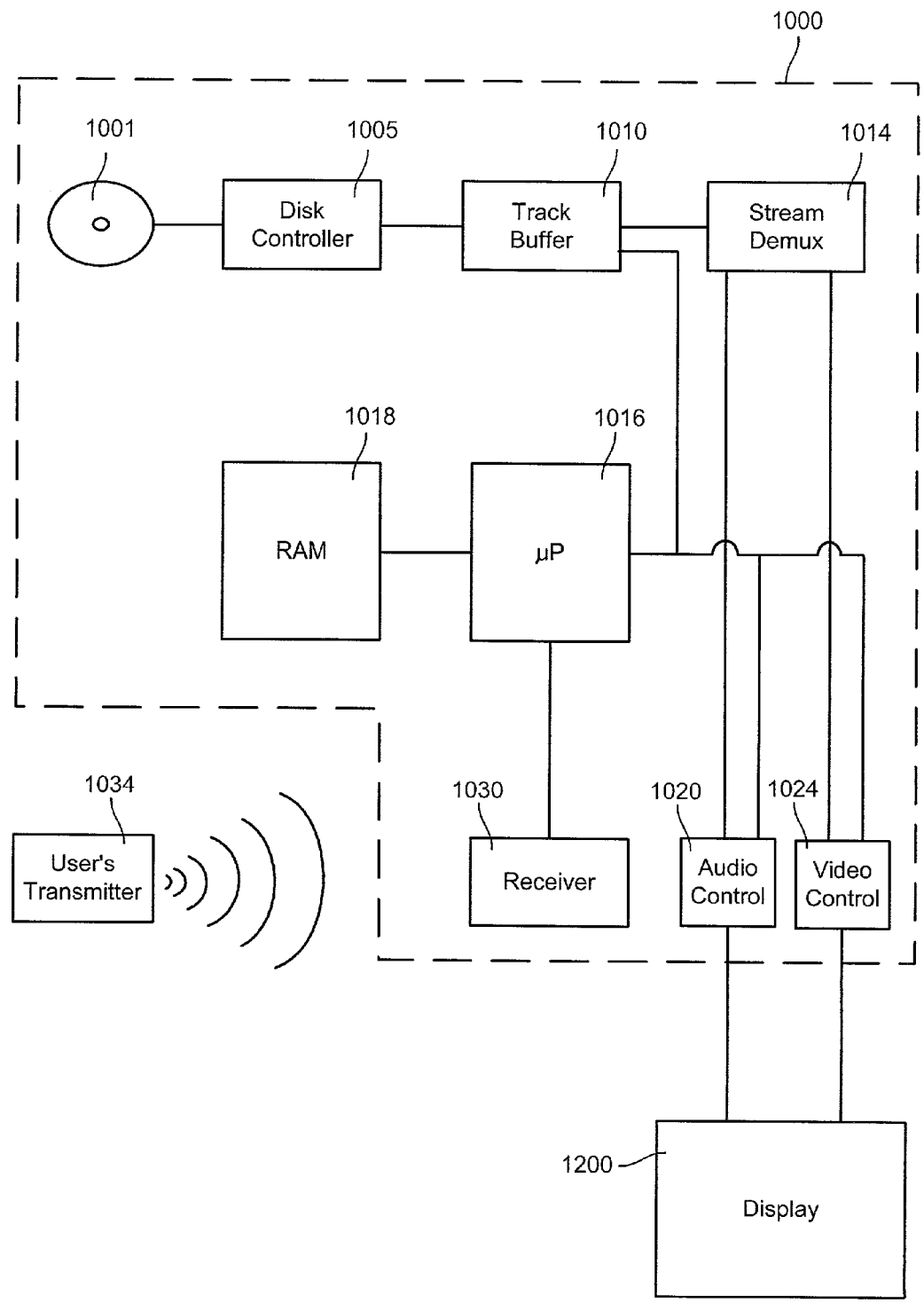
FIG. 10 is a simple circuit diagram for implementing the present invention.

FIG. 10 illustrates a circuit for implementing the invention according to the flowchart of FIG. 9. In circuit 1000, a DVD disc 1001 is shown coupled to a disk controller 1005. Typically a pickup will be used as a transducer to input the data from a DVD disc, for example. The disk controller is coupled to a track buffer 1010 which stores data for the presentation being displayed. This information can then be decoded by the processor. For example, the processor can separate selected chunks of data corresponding with the selected presentation for display. Similarly, the processor can be used to convert an MPEG encoded data stream to a format suitable for output. Information is conveyed from the track buffer to a stream demultiplexer 1014 in which the various audio and video streams are demultiplexed. These demultiplexed streams are subsequently conveyed to audio controller 1020 and video controller 1024.

A display 1200 receives data from the video controller and audio controller to display the presentation. A processor 1016 controls the implementation of the flowcharts described above through software. The processor is coupled to a memory such as RAM 1018. The user can provide input to the circuit through the use of a transmitter 1034, such as a remote control associated with a DVD player. The output from the transmitter is directed to a receiver 1030 which is coupled to the processor 1016. This circuit builds upon the circuit shown on page 135 of "DVD Demystified" by Jim Taylor, McGraw Hill publisher, copyright 1998, the entire content of which is hereby incorporated by reference in its entirety for all that it discloses and for all purposes.

It is thought that the systems and methods of the embodiments of the present invention and many of its attendant advantages will be understood from this specification and it will be apparent that various changes may be made in the form, construction and arrangement of the parts thereof without departing from the spirit and scope of the invention or sacrificing all of its material advantages, the form herein before described being merely exemplary embodiments thereof.

What is claimed is:

1. A method for enabling a user to create a customized video presentation from one or more preexisting digital video titles on a DVD, the method comprising:

selecting least one video frame from the one or more preexisting digital video titles by the user, wherein the video frame selected can be any video frame from the one or more preexisting digital video titles;

selecting one or more interest points from the at least one selected video frame by the user;

manipulating the one or more interest points in the associated video frame in response to the user by generating a set of op-code instructions that are used to permanently modify original video data corresponding to the one or more interest points in the associated video frame; and storing a file on the digital video disc (DVD) separate from the original video data stored on the DVD after manipulating the one or more interest points in the associated video frame, said file storing the video frame manipulated by the op-code instructions in response to the user and having identifiers for relating the manipulated video frame and the one or more interest points to the associated preexisting digital video title containing the original video data corresponding to the video frame before manipulation, the original video frame also remaining stored on the DVD in unaltered form, wherein during playback of the customized video presentation by DVD player, said file causes said DVD player to display the manipulated video frame stored in the file on the DVD in place of the corresponding original video frame from the preexisting digital video title stored on the DVD such that a user is able to examine the one or more interest points in the manipulated video frame, said location of said corresponding original video frame from the preexisting digital video title being specified by the associated identifiers in said file.

2. The method of claim 1 wherein said identified video frame is a z-frame.

3. The method of claim 1 further comprising the step of manipulating the z-frame using a function chosen from the group consisting of zoom, pan and gamma correct.

4. The method of claim 1 wherein said interest point is a vista point.

5. The method of claim 4, the method further comprising: selecting a pause time for the video frame, wherein the pause time controls the duration of any display of the z-frame.

6. The method of claim 4, the method further comprising: entering a gamma correction for the interest point of the z-frame.

7. The method of claim 1 wherein said identifying the video frame further comprises identifying a pre-roll time prior to the video frame, wherein said pre-roll time is the amount of time the video plays prior to stopping on the video frame.

8. The method of claim 1 wherein said identifying the interest point further comprises identifying an x-coordinate and a y-coordinate for the interest point.

9. The method of claim 1 wherein the identifying the interest point further comprises identifying a zoom level for the interest point.

10. The method of claim 1 wherein said identifying the interest point further comprises selecting a gamma correction for the interest point.

11. The method of claim 1, wherein the op-code instructions include instructions to insert commentary into the manipulated video frame, the commentary including verbal or textual commentary, a zoom effect for zooming into one or more interest points, a frame freeze effect, a luminance change effect and a color correction effect.

12. An apparatus for enabling a user to create and display a customized video presentation from a preexisting digital video title on a DVD during playback of the preexisting digital video title, said apparatus comprising:

a user interface for enabling a user to select at least one video frame from the preexisting digital video title, wherein the video frame selected can be any video frame from the preexisting digital video title;

a user interface for enabling a user to select one or more interest points from the video frame;

a user interface for enabling the user to enter information associated with the one or more interest points from the video frame a user interface for enabling the user to enter a control for one or more interest points from the video frame an annotator tool arranged to generate a set of op-code instructions used to permanently modify original video data corresponding to the one or more interest points from the video frame based on the information and control entered by the user;

an interest point chart for listing the one or more interest points associated with the modified video frame;

an interest point setting area, said interest point setting area having a user interface for enabling a viewer to enter an x-coordinate and y-coordinate for each of the one or more interest points; and a means for storing a file on the DVD separate from the original video data stored on the DVD after modifying the one or more interest points in the associated video frame, the file storing the video frame modified by the op-code instructions in response to the user, the information associated with the modified video frame, the controls for said modified video frame the x-coordinates and the y-coordinates of the one or more interest points, and identifiers for relating the modified video frame and the one or more interest points to the associated preexisting digital video title containing the original video frame, wherein during playback of the customized video presentation by a DVD player, said file cause said DVD player to display the modified video frame stored in the file on the DVD in place of the corresponding original video frame from the preexisting digital video title stored on the DVD such that a user is able to examine the one or more interest points in the modified video frame, said location of said corresponding original video frame from the preexisting digital video title being specified by the associated identifiers in said file.

13. The apparatus of claim 12, wherein the control for said video frame comprises a control selected from a group consisting of a pause time and a pre-roll time.

14. The apparatus of claim 12, wherein the control for said video frame comprises a pause time and a pre-roll time for the video prior to said pause time.

15. The apparatus of claim 12, wherein the interest point setting area further comprises a user interface for entering a zoom level for the one or more interest points.

16. The apparatus of claim 12, further comprising: entering a gamma correction level for the one or more interest points.

17. The composer of claim 12, wherein the op-code instructions include instructions to insert commentary into the modified video frame, the commentary including verbal or textual commentary, a zoom effect for zooming into one or more interest points, a frame freeze effect, a luminance change effect and a color correction effect.

* * * * *